US009868008B2

(12) United States Patent
Todokoro

(10) Patent No.: US 9,868,008 B2
(45) Date of Patent: Jan. 16, 2018

(54) JUNGLE GYM

(71) Applicant: AGATSUMA CO., LTD, Tokyo (JP)

(72) Inventor: Shinji Todokoro, Tokyo (JP)

(73) Assignee: AGATSUMA CO., LTD., Tokyo (JP)

( * ) Notice: Subject to any disclaimer, the term of this patent is extended or adjusted under 35 U.S.C. 154(b) by 31 days.

(21) Appl. No.: 15/046,971

(22) Filed: Feb. 18, 2016

(65) Prior Publication Data
US 2016/0250508 A1 Sep. 1, 2016

(30) Foreign Application Priority Data

Feb. 26, 2015 (JP) ................................. 2015-036068

(51) Int. Cl.
| A63B 9/00 | (2006.01) |
| A63B 17/00 | (2006.01) |
| F16B 12/40 | (2006.01) |
| F16B 7/04 | (2006.01) |
| A63G 21/00 | (2006.01) |

(52) U.S. Cl.
CPC .............. *A63B 9/00* (2013.01); *F16B 7/0446* (2013.01); *F16B 12/40* (2013.01); *A63B 2009/006* (2013.01); *A63B 2208/12* (2013.01); *A63B 2210/50* (2013.01); *A63B 2225/093* (2013.01); *A63G 21/00* (2013.01)

(58) Field of Classification Search
CPC .......... A63B 2009/006; A63B 2210/50; A63B 2210/52; A63B 2210/58; A63B 9/00; A63B 2009/008; F16B 12/40
USPC ..................................................... 285/86, 87
See application file for complete search history.

(56) References Cited

U.S. PATENT DOCUMENTS

| 1,488,244 A | * | 3/1924 | Hinton ..................... A63B 9/00 |
| | | | 482/36 |
| 5,326,337 A | * | 7/1994 | Pardella ................... A63B 9/00 |
| | | | 403/170 |
| 5,356,354 A | * | 10/1994 | Owens ..................... A63B 9/00 |
| | | | 482/35 |

(Continued)

FOREIGN PATENT DOCUMENTS

| CN | 201747718 U | 2/2011 |
| EP | 2 256 355 A1 | 12/2010 |

(Continued)

OTHER PUBLICATIONS

Extended European Search Report for EP Application No. 16155603.3-1658, Reference HJL00853EP, dated Jul. 20, 2016.

*Primary Examiner* — Nyca T Nguyen
(74) *Attorney, Agent, or Firm* — The Marbury Law Group, PLLC

(57) ABSTRACT

A jungle gym is provided which has a base frame group where three cubic frames are formed continuously in a y axis direction by pluralities of pipes provided in an x, y and z axis directions, and a plurality of jungle gym joints each including a joint main body and a rotary member and where the rotary member is connected rotatably to the joint main body so as to form a folding portion which can be folded in one direction within an angular extent of 90 degrees, and the pipes in the y and z axis directions are connected to the joint main bodies, while the pipes in the x axis direction are connected to end portions of the rotary members lying opposite to end portions where the folding portions are formed, all the folding portions being rotated in the same direction.

19 Claims, 12 Drawing Sheets

(56) References Cited

U.S. PATENT DOCUMENTS

| | | | |
|---|---|---|---|
| 5,555,987 A | 9/1996 | Yoshimura et al. | |
| 2002/0010054 A1* | 1/2002 | Araki | A63B 9/00 482/35 |
| 2012/0157266 A1 | 6/2012 | Todokoro | |
| 2014/0361564 A1 | 12/2014 | Huang | |

FOREIGN PATENT DOCUMENTS

| | | | |
|---|---|---|---|
| JP | 2001-340665 A | 12/2001 | |
| JP | 3102074 U | 3/2004 | |
| JP | 3116831 U | 12/2005 | |
| JP | 2008-291945 A | 12/2008 | |
| WO | WO 2004002595 A1 * | 1/2004 | A63B 9/00 |

\* cited by examiner

JUNGLE GYM

CROSS-REFERENCE TO RELATED APPLICATION

This patent application is based upon and claims the benefit of priority under 35 USC 119 of Japanese Patent Application No. 2015-036068 filed on Feb. 26, 2015, the entire disclosure of which, including the specification, claims, drawings and abstract, is incorporated herein by reference.

BACKGROUND OF THE INVENTION

Field of the Invention

The present invention relates to a jungle gym with which infants can play indoors and which can be folded for stowage.

Description of the Related Art

Conventionally, jungle gyms have been proposed with which infants can play indoors. These indoor jungle gyms are formed by combining a plurality of cubic frames, so that infants can play with them indoors as they do with jungle gyms which are placed outdoors as in parks. Thus, the indoor jungle gyms are play equipment with which infants can play keenly indoors.

There is a tendency that these indoor jungle gyms are getting larger in size. To deal with this, there are proposed constructions in which foldable joints are used to allow the whole of a jungle gym is folded so that the jungle gym can be stowed compact when not in use.

For example, Japanese Utility Model Registration No. 3102074 discloses a jungle gym which includes a plurality of vertical pipes which are disposed in an up-to-down direction, a plurality of longitudinal horizontal pipes which are disposed in a left-to-right direction and a plurality of transverse horizontal pipes which are disposed in a front-to-rear direction and in which adjacent longitudinal horizontal pipes are folded in a direction in which the longitudinal horizontal pipes get together. The longitudinal horizontal pipes are connected to joints which are rotated through 90 degrees, and the transverse horizontal pipes are connected to the joints in a fixed fashion. Therefore, the longitudinal horizontal pipes can be rotated in the direction in which the longitudinal horizontal pipes get together, whereby the whole of the jungle gym can be folded. In this way, the jungle gym can be stowed compact in comparison with a state in which the jungle gym is deployed for use.

However, in a lowermost level of the jungle gym described above where three cubic frames are arranged in a straight line, there are portions where the longitudinal horizontal pipes are folded in such a way as to hold the transverse horizontal pipe therebetween. Even in a portion where the longitudinal horizontal pipes are folded in such a way as to hold no transverse horizontal pipe therebetween, the longitudinal horizontal pipes lying on both sides of the joint are rotated in an opposite direction, and therefore, a space which is greater than a diameter of the transverse horizontal pipe is defined between the longitudinal horizontal pipes. Consequently, the longitudinal horizontal pipes which lie opposite to each other when the jungle gym is deployed are arranged in series with each other when the jungle gym is folded, and the transverse horizontal pipes are arranged in a step-like fashion. Consequently, a thickness of the jungle gym which results from the folding of the jungle gym in the way described above makes it difficult for the folded jungle gym to be stowed between a wall and furniture depending on a residential place.

SUMMARY OF THE INVENTION

The invention has been made in view of these situations and an object of the invention is to provide a jungle gym which can reduce a thickness thereof which results when the jungle gym is folded.

According to an aspect of the invention, there is provided a jungle gym having: a base frame group in which three cubic frames are formed continuously in the direction of a y axis by a plurality of pipes provided in the direction of an x axis, a plurality of pipes provided in the direction of the y axis and a plurality of pipes provided in the direction of a z axis; and a plurality of jungle gym joints each including a joint main body and a rotary member and in which the rotary member is connected rotatably to the joint main body so as to form a folding portion which can be folded in one direction within an angular extent of 90 degrees, wherein the pipes provided in the direction of the y axis and the pipes provided in the direction of the z axis are connected to the joint main bodies, and wherein the pipes provided in the direction of the x axis are connected to end portions of the rotary members which lie opposite to end portions where the folding portions are formed.

The folding portion is such that a flat plate portion and a bifurcate portion are connected rotatably in such a way that the flat portion is inserted into the bifurcate portion so as to be held therein, at least one of the folding portions comprises a cylindrical cover member which is restricted from moving in the direction of an axis while being allowed to rotate about the axis, and the cover member includes a restricting wall portion configured to restrict the folding portion from being folded by bringing a circumferential wall thereof into abutment with either the flat plate portion or the bifurcate portion and a cutout portion which is formed in the circumferential wall by partially cutting out the circumferential wall so as not to be brought into abutment with either the flat plate portion or the bifurcate portion to thereby release the folding of the folding portion.

Cover members like the cover member are provided individually at least four central folding portions of the folding portions.

The jungle gym also includes a half frame group in which three half cubic frames whose height in the direction of the z axis is half a height of the cubic frames of the base frame group are provided continuously from the base frame group in the direction of the z axis, an upper half frame which is provided continuously from a central half cubic frame of the half frame group in the direction of the z axis, and a top frame which is a cubic frame provided continuously from the upper half frame in the direction of the z axis, and the folding portions are formed so as to be folded about the z axis.

The jungle gym includes an additional base frame which is a cubic frame provided continuously from one cubic frame of the base frame group in the direction of the x axis.

The jungle gym includes a fixed member having a decorated flat surface portion and fixed to a pipe in the pipes provided in the direction of the y axis and a pipe in the pipes provided in the direction of the z axis.

The jungle gym includes at least one combination of the jungle gym joints in which in the plurality of jungle gym joints, the jungle gym joints which lie adjacent in positions which shift from each other in the direction of the y axis and the direction of the z axis are connected together by a curved pipe.

According to the aspect of the invention, the pipes provided in the direction of the y axis and the pipes provided in the direction of the z axis are connected to the jungle gym joints in a fixed fashion. The pipes provided in the direction of the x axis are folded by means of the folding portions of the jungle gym joints, whereby the jungle gym can be folded. The foldable pipes are rotated at all the folding portions in the same direction. In the event that the jungle gym configured in the way described heretofore is folded, the pipe in the direction of the x axis is folded closely between the pipes in the direction of the y axis which lie adjacent oppositely to the left or right in the two cubic frames which lie adjacent to each other in such a state that the jungle gym is deployed. The pipes which are arranged in series with each other in such a deployed state are kept arranged in series, and the pipes in the direction of the x axis are folded so as to be arranged in series. Consequently, a thickness of the jungle gym which results when the jungle gym is folded can be made thin. This can increase the number of spaces where the jungle gym can be stowed between furniture and a wall in a residential place, whereby the jungle gym can be made more convenient for stowage.

In addition, the jungle gym includes the cylindrical cover members which can rotate about the axis, and the pipes can be restricted from being folded at the folding portions or can be permitted to be folded at the folding portions by controlling the rotation of the cover members. Thus, the folding restricting and permitting operations can be performed simply and easily, and hence, the jungle gym can be deployed for use and folded for stowage within a short period of time.

The cover members are provided at the four central portions of the jungle gym to which the greatest force is applied when infants mount to play therewith, whereby the folding of the pipes at the folding portions can be restricted efficiently, and further, the folding operation of the jungle gym can be performed efficiently.

In the event that the jungle gym is formed so as to include further the half frame group which is made up of the half cubic frames whose height is half the height of the cubic frames, the difference in level can be produced in the jungle gym, whereby infants can play with the jungle gym more enjoyably.

The additional base frame is provided which is connected additionally to the base frame group in the direction of the x axis, whereby other playing equipment such as a slide can easily be connected to the additional base frame, thereby making it possible to the jungle gym with which infants can play far more enjoyably.

The fixed member including the decorated flat surface portion is connected to the pipe in the direction of the y axis and the pipe in the direction of the z axis. In the jungle gym according to this invention, with the decorated fixed member kept attached to the pipe in the direction of the y axis and the pipe in the direction of the z axis, the jungle gym can be folded for stowage even in such a state that the fixed member is kept so attached.

Similarly, the jungle gym joints which lie in the positions which shift from each other in the direction of the y axis and the direction of the z axis can also be connected together by the curved pipe. This enables even small infants to mount and dismount from the jungle gym by making use of the curved pipe, and the jungle gym can be folded for stowage even with the curved pipe kept so attached.

DETAILED DESCRIPTION OF THE PREFERRED EMBODIMENT

Figure 1:
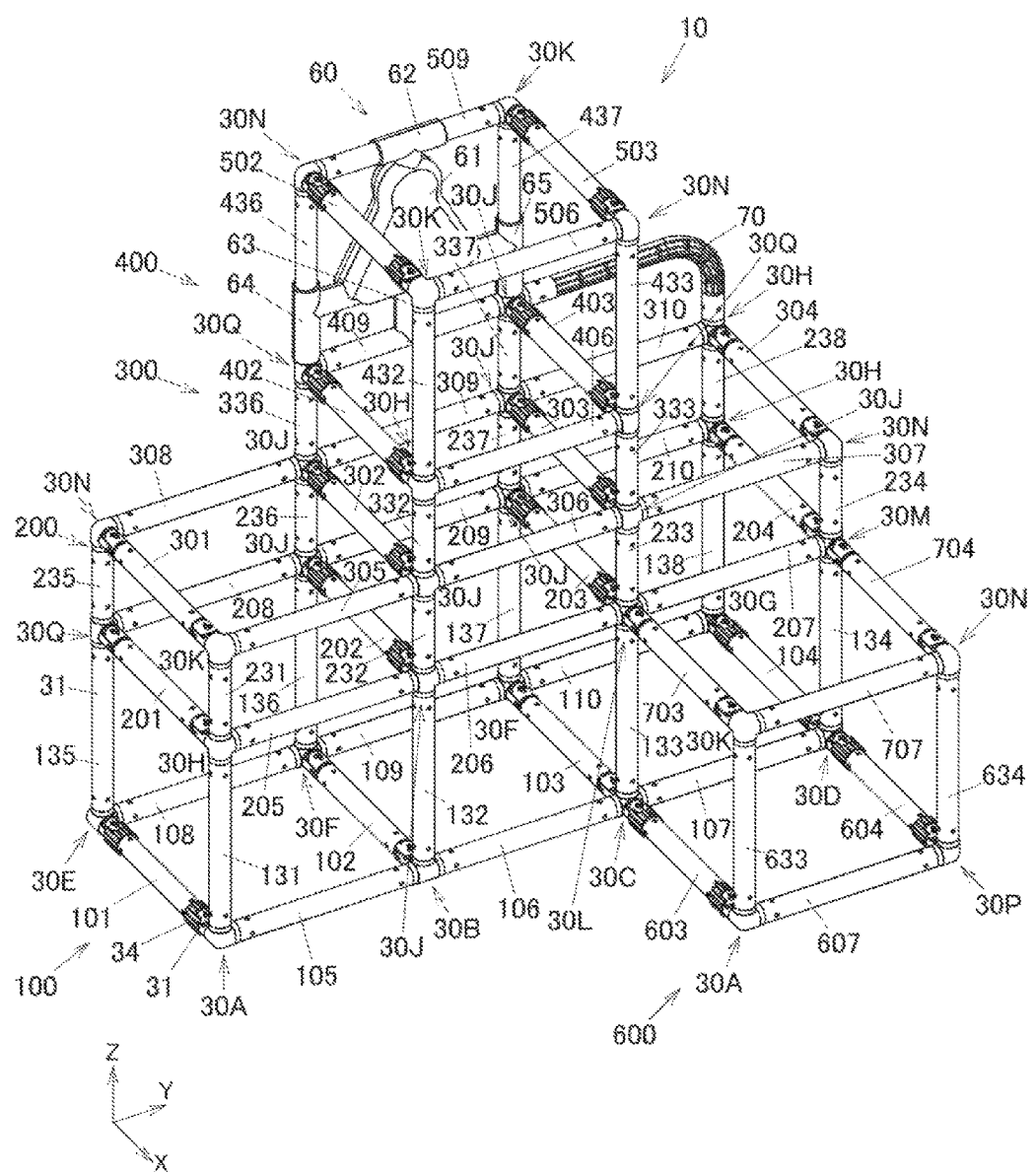
FIG. 1 is a perspective view of a jungle gym according to an embodiment of the invention.

Hereinafter, an embodiment of the invention will be described based on the drawings. A jungle gym of this embodiment is play equipment or a jungle gym which is set indoors and is designed to be folded when stowed. Consequently, FIG. 1 shows a state in which the jungle gym 10 is deployed for use. In the following description, a front side (a positive direction in relation to the direction of an x axis) of the jungle gym 10 is referred to as front, and a back side (a negative direction in relation to the direction of the x axis) of the jungle gym 10 is referred to as rear. In addition, a left-hand side (a negative direction in relation to the direction of a y axis) of the jungle gym 10 when viewed from the front thereof is referred to as left, and a right-hand side (a positive direction in relation to the direction of the y axis) of the jungle gym 10 when viewed from the front thereof is referred to as right. Further, an upper side (a positive direction in relation to a z axis) of the jungle gym 10 is referred to as top or up, and a lower side (a negative direction in relation to the direction of the z axis) of the jungle gym 10 is referred to as bottom or down.

As shown in FIG. 1, in the jungle gym 10, a plurality of cylindrical pipes (101 to 110) are arranged to extend in the directions of the x axis, the y axis and the z axis which are at right angles to one another to be connected to a plurality of jungle gym joints (30A to 30H).

This jungle gym 10 is formed by combining a number of cubic frames. A base frame group 100 which is made up of three cubic frames and an additional base frame 600 are provided at a lowermost level. A half frame group 200, which is made up of three half cubic frames whose height is about half a height of the cubic frame, is connected to an upper side of the base frame group 100. An upper half frame 300, which is made up of one half cubic frame, is connected to an upper side of a central half cubic frame of the half frame group 200. Then, a top frame 400, which is made up of one cubic frame, is connected to an upper side of the upper half frame 300.

In jungle gym joints (30A and the like) which are formed to have the x axis, the y axis and the z axis which are at right angles to one another, jungle gym joints which are given the same numerals are formed as common parts. These jungle gym joints are formed as three- to six-branch joints depending upon where they are used.

In the jungle gym 10, the base frame group 100 is placed at the lowermost level in which the three cubic frames are formed continuously in the direction of the y axis. Specifically, the central cubic frame in the base frame group 100 has four pipes 102, 103, 202, 203 which extend in the direction of the x axis, four pipes 106, 109, 206, 209 which extend in the direction of the y axis and four pipes 132, 133, 136, 137 which extend in the direction of the z axis. Then, these pipes are connected to jungle gym joints 30B, 30C, 30F (two), 30J (three) and 30L.

In the base frame group 100, the cubic frames are connected continuously to a left-hand side and right-hand side of the central cubic frame in the direction of the y axis. In the central cubic frame of the base frame group 100, the pipes 102, 202 and the pipes 103, 203 which extend in the direction of the x axis, the pipes 132, 136 and the pipes 133, 137 which extend in the direction of the z axis, and the jungle gym joints (30B and the like) which are connected to these pipes are commonly shared by the left and right cubic frames.

The half frame group 200 is connected continuously to the upper side of the base frame group 100, and in the half frame group 200, the three half cubic frames whose height in the direction of the z axis is about half the height of the cubic frames of the base frame group 100 are formed continuously in the direction of the y axis. For example, the central half cubic frame of the half frame group 200 has four pipes 202, 203, 302, 303 which extend in the direction of the x axis, four pipes 206, 209, 306, 309 which extend in the direction of the y axis and four pipes 232, 233, 236, 237 which extend in the direction of the z axis. Then, these pipes are connected to seven jungle gym joints 30H and one jungle gym joint 30L.

In the central half cubic frame of the half frame group 200, the pipes 202, 302 and the pipes 203, 303 which extend in the direction of the x axis, the pipes 232, 236 and the pipes 233, 237 which extend in the direction of the z axis and the jungle gym joints (30L and the like) which are connected to these pipes are commonly shared by the left and right half cubic frames. The pipes (202, 206 and the like) extending in the direction of the x axis and the direction of the y axis which correspond to lower sides of the half frame group 200 and the jungle gym joints (30L and the like) are commonly shared by the corresponding cubic frames of the base frame group 100.

The upper half frame 300 is connected to the upper side of the central half cubic frame of the half frame group 200, and this upper half frame 300 is formed as the same half cubic frame as the half cubic frames of the half frame group 200. In the half cubic frame of the upper half frame 300, too, the pipes (302, 306 and the like) which make up upper sides of the central half cubic frame of the half frame group 200 which lies adjacent to a lower side of the upper half frame 300 and the jungle gym joints (30J and the like) to which these pipes are connected are commonly shared.

The top frame 400 is connected to the upper side of the upper half frame 300, and this top frame 400 is made up of the cubic frame. The cubic frame of the top frame 400 is formed to the same dimensions as those of the cubic frames of the base frame group 100. In the top frame 400, too, pipes (402, 406 and the like) extending in the direction of the x axis and the direction of the y axis which correspond to lower sides of the top frame 400 and jungle gym joints (30H and the like) to which these pipes are connected are commonly shared as upper sides of the upper half frame 300 which is connected contiguously to the top frame 400.

The additional base frame 600 which is made up of the cubic frame is connected to the cubic frame of the base frame group 100 which lies at an end portion in the positive direction in relation to the direction of the y axis, and this additional base frame 600 extends from the cubic frame in the positive direction in relation to the direction of the x axis. The cubic frame of the additional base frame 600 is formed to the same dimensions as those of the cubic frames of the base frame group 100 and the cubic frame of the top frame 400. Then, pipes (207, 133 and the like) which correspond to rear sides of the additional base frame 600 and jungle gym joints (30C and the like) to which these pipes are connected are shared commonly by the cubic frame which is connected to the base frame group 100.

In addition, a fixed member 60 is provided on the top frame 400 at a portion which corresponds to rear sides of the top frame 400. A flat surface portion is formed on each of front and rear sides of a main body portion 61 thereof. The main body portion 61 has a substantially triangular external shape in which a top portion is formed into an arc-like shape when seen from the front thereof and which expands wider in the direction of the y axis as it extends downwards. An upper engaging portion 62 is provided on the top portion of the main body portion 61 so as to be brought into engagement with a pipe 509 which extends in the direction of the y axis. Similarly, a lower engaging portion 63 is provided at a lower side of the main body portion 61 so as to be brought into engagement with a pipe 409 which extends in the direction of the y axis. Additionally, a left engaging portion 64 and a right engaging portion 65 are also provided at the lower side of the main body portion 61 so as to be brought into engagement with a left pipe 436 and a right pipe 437 which extend in the direction of the z axis, respectively.

A curved pipe 70 extends between a right rear jungle gym joint 30J which is shared by the top frame 400 and the upper half frame 300 (that is, the jungle gym joint 30J which is connected to pipes 403, 409, 437, 337) and a jungle gym joint 30H which is located in a position which is shifted in the positive direction in relation to the direction of the y axis and the negative direction in relation to the direction of the z axis from the jungle gym joint 30J (that is, the jungle gym joint 30H which is connected to pipes 238, 304, 310) to be connected individually to those jungle gym joints 30J, 30H.

In the jungle gym 10 which is configured in the way described above, pipes (101, 102 and the like) which extend in the direction of the x axis are formed as common parts which are formed to the same dimension. Similarly, pipes (105, 205 and the like) which extend in the direction of the y axis are also formed as common parts. Pipes (131, 231 and the like) which extend in the direction of the z axis are made up of two types of pipes, that is, long pipes which are formed so as to make up the cubic frames and short pipes (231, 332 and the like) which are formed to the length which is half the length of the long pipe so as to make up the half cubic frames.

The jungle gym joints (30A and the like) have the same construction at the connecting portion where the pipes are connected but are different only in the number of pipes to be connected, that is, foldable pipes (101 and the like) which extend in the direction of the x axis and fixed pipes (105, 131) which extend in the direction of the y axis and the direction of the z axis. Consequently, in the following description of the jungle gym joint, the invention will be described as being applied to the six-branch jungle gym joint 30L (in other words, the jungle gym joint 30L which is an upper six-branch joint which is shared by the base frame group 100 and the additional base frame 600).

Figure 2:
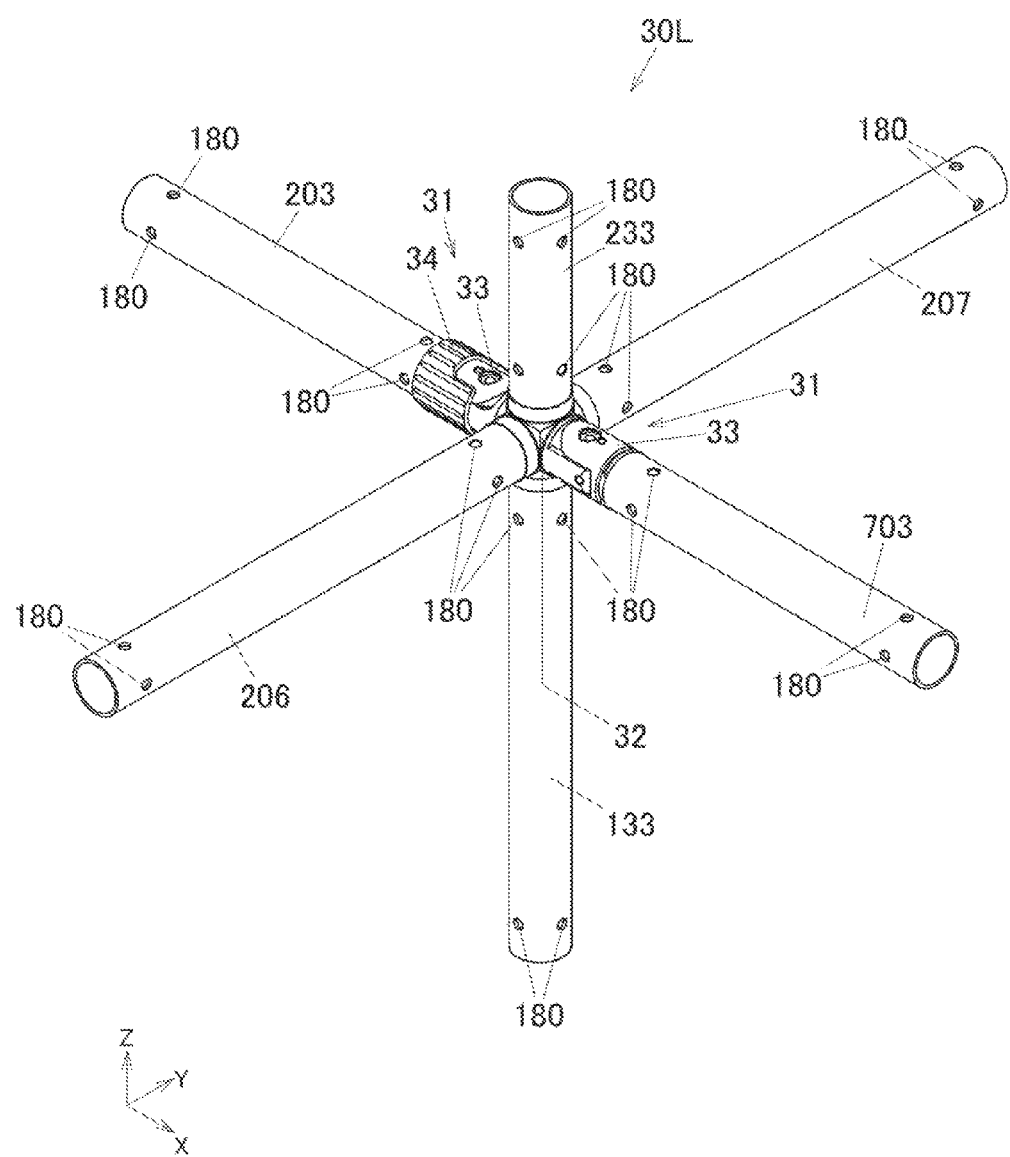
FIG. 2 is a perspective view showing a jungle gym joint and pipes which are connected thereto according to the embodiment of the invention.

As shown in FIG. 2, a pipe 703 and a pipe 203, which are a front pipe and a rear pipe in relation to the direction of the x axis, are connected to the jungle gym joint 30L. Similarly, pipes 206, 207, which are a left pipe and a right pipe in relation to the direction of the y axis, and pipes 233, 133, which are an upper pipe and a lower pipe in relation to the direction of the z axis, are also connected to the jungle gym joint 30L. Folding portions 31 are formed on the jungle gym joint 30L so that the pipes 703, 203 which extend in the direction of the x axis can be folded to an angular extent of 90 degrees. A substantially cylindrical cover 34 is provided on an outer circumference of the folding portion 31 to which the rear pipe 203 extending in the direction of the x axis is connected. The cover member 34 is restricted from moving in the direction of an axis thereof but is allowed to rotate freely about the axis. The folding portion 31 is restricted from being folded and is allowed to be folded by rotating the cover member 34.

Figure 3:
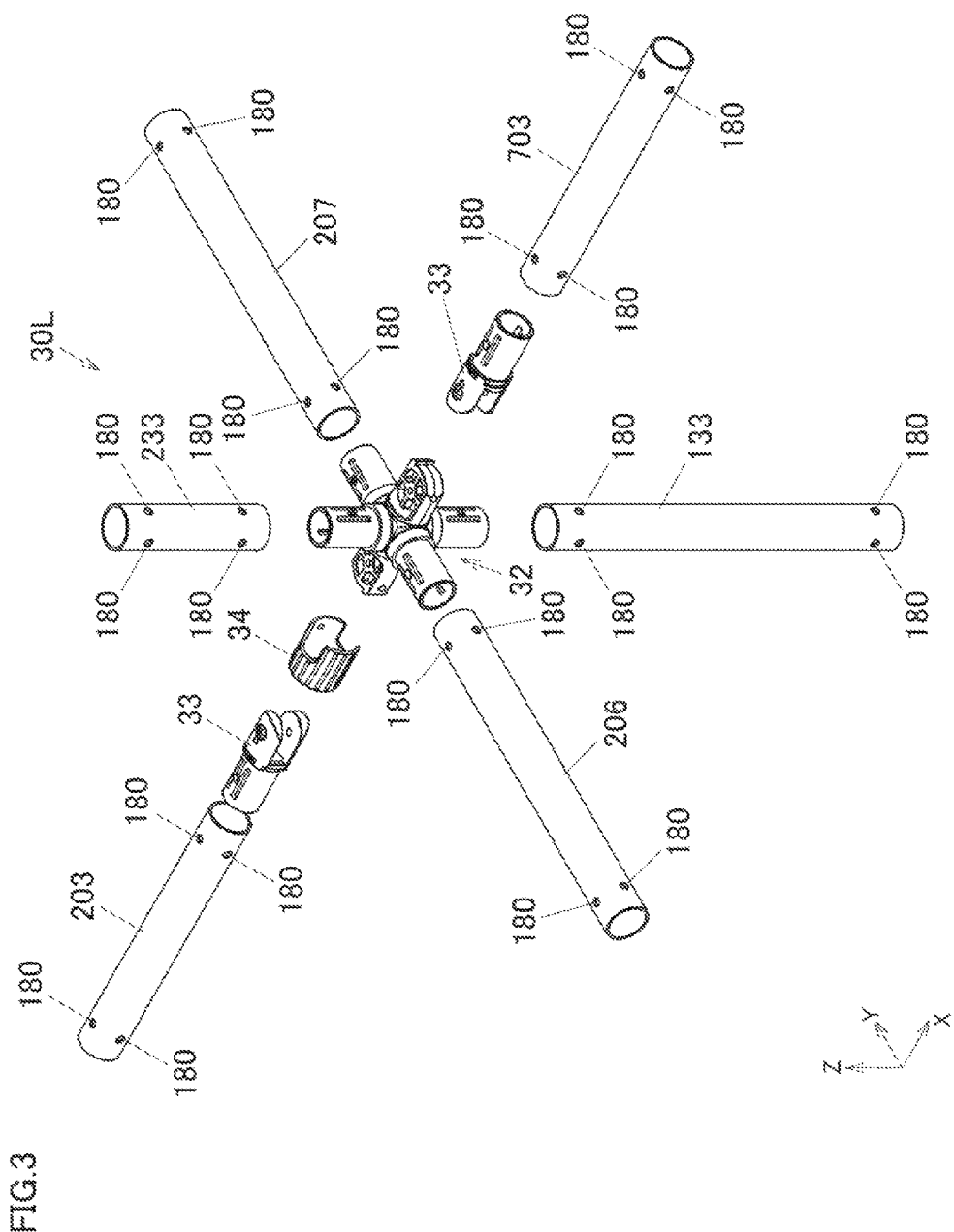
FIG. 3 is an exploded perspective view showing the jungle gym joint and the pipes connected thereto according to the embodiment of the invention.
Figure 4:
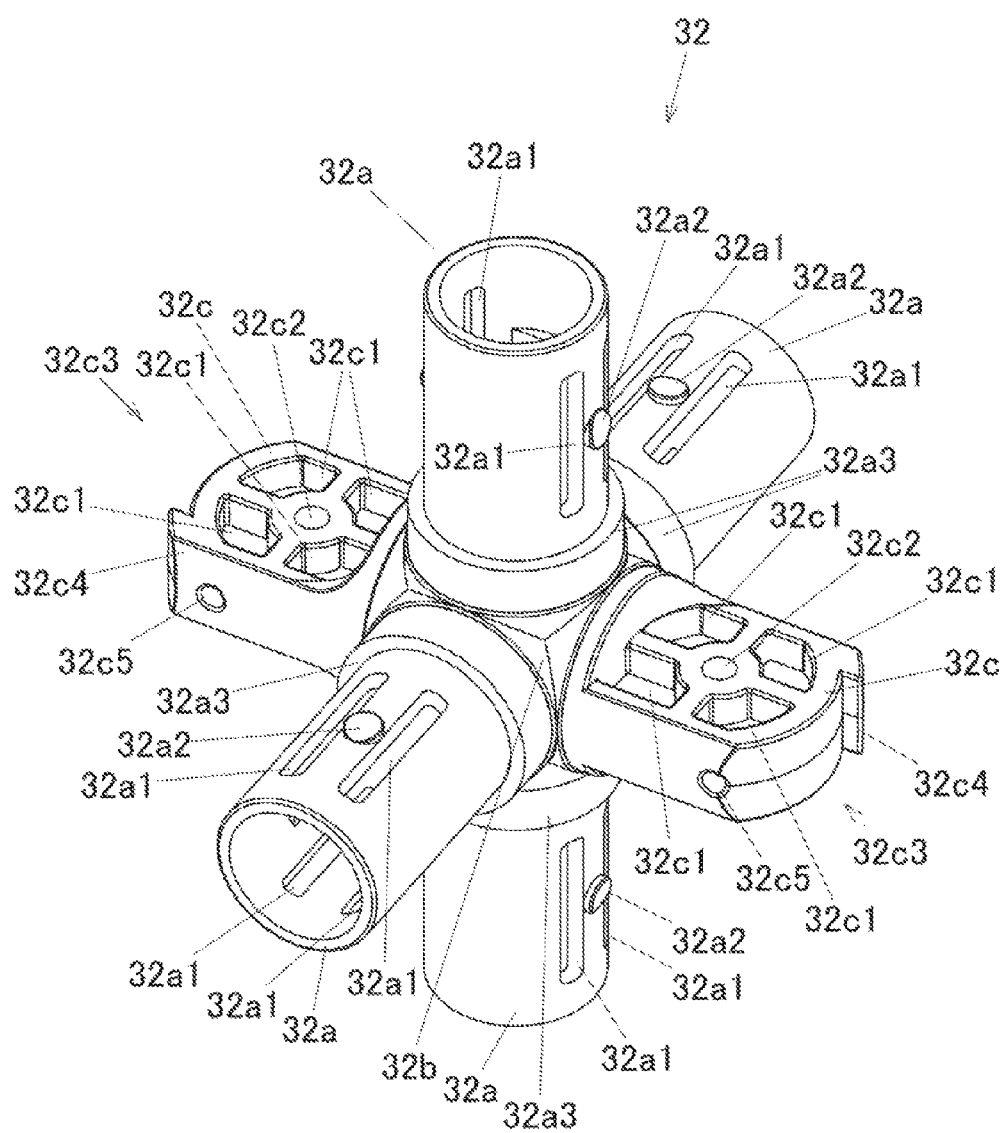
FIG. 4 is a perspective view showing a joint main body according to the embodiment of the invention.

As shown in FIG. 3, the jungle gym joint 30L is made up of a joint main body 32, two rotary members 33 which are disposed back and forth in the direction of the x axis and the cover member 34 described above. As shown in FIG. 4, the joint main body 32 includes joint shafts 32a to which the pipes are connected, and these joint shafts 32a are provided so as to project from a proximal portion 32b to the left and the right in relation to the direction of the y axis and towards the top and the bottom in relation to the direction of the z axis. The joint shafts 32a are formed into a substantially cylindrical shape. Two parallel long cutout portions 32a1 are formed on an outer circumferential wall of the joint shaft 32a so as to extend along an axis thereof. A locking projection 32a2 is provided on the outer circumferential wall of the joint shaft 32a in a position lying between the two cutout portions 32a1. Additionally, two cutout portions 32a1 and a locking projection 32a2 are also provided at a diametrically opposite side of the outer circumferential wall of the joint shaft 32a.

The joint main body 32 is formed entirely from a resin material through injection molding. Consequently, the outer circumferential wall which supports the locking projections 32a2 has elasticity by the action of the cutout portions 32a1. On the other hand, four locking holes 180 are provided at equal intervals in a circumferential direction on an outer circumferential wall of the pipe (206 or the like) near each end portion thereof (refer to FIGS. 2, 3).

Consequently, when the pipe (206 or the like) is inserted into the joint shaft 32, the locking projections 32a2 sink radially inwards of the joint shaft 32a. Then, when the locking holes 180 are aligned with the locking projections 32a2, the locking projections 32a2 are sprung back into the locking holes 180 so as to be locked therein, whereby the insertion of the pipe (206 or the like) is completed. The locking projections 32a2 are formed so as to be inclined at a side from which the pipe (206 or the like) is inserted so that the locking projections 32a2 are lowered in height or projection towards the outer circumferential surface of the joint shaft 32a. This facilitates the insertion of the pipe (206 or the like).

In the joint shafts 32a which lie axially opposite to each other, holes defined by inner surfaces of cylindrical portions thereof penetrate the proximal portion to communicate with each other. Consequently, the holes defined by the inner surfaces of the cylindrical portions of the left and right joint shafts 32a disposed in the direction of the y axis or the y axis direction and the upper and lower joint shafts 32a disposed in the direction of the z axis or the z axis direction intersect one another in an interior of the proximal portion 32b.

An annular portion 32a3 is formed on an end of the joint shaft 32a which lies to face the proximal portion 32b, and this annular portion 32a3 has a diameter which is greater than the cylindrical portion of the joint shaft 32a. An outer circumferential surface of the annular portion 32a3 is formed so as to constitute a surface which continues to the outer circumferential surface of the pipe (206 or the like) when the pipe (206 or the like) is fitted on the joint shaft 32a to be connected thereto.

Flat plate portions 32c are formed on the joint main body 32 so as to project from the proximal portion 32b to the front and the rear in the x axis direction, respectively. The flat plate portion 32c projecting to the front and the flat plate portion 32c projecting to the rear have the same shape. The flat plate portion 32c is formed into a substantially flat plate shape whose flat surface portions are oriented upwards and downwards. Four recessed portions 32c1 are formed on each of the upper and lower flat surface portions of each flat plate portion 32c by removing the resin material partially for reduction in weight thereof.

A through hole 32c2 is provided in a substantially central position on the flat surface of each flat plate portion 32c. A pin member is inserted through the through hole 32c2 and through holes 33b1 (refer to FIG. 5) in a rotary member 33. Consequently, the rotary member 33 is supported rotatably by the flat plate portion 32c.

A projecting end portion 32c3 of the flat plate portion 32c is formed into a projecting arc-like shape when viewed from there above, and a rotation restricting projection 32c4 is formed at one terminating end portion of the projecting arc-like shape, and this rotation restricting portion 32c4 has a surface which continues to a side surface of the flat plate portion 32c. In other words, in an assembled state (refer to FIG. 7), the rotation restricting projection 32c4 projects towards the rotary member 33. As has been described before, since the flat plate portions 32c4 have the same shape, the front rotation restricting projection 32c4 is formed at a right end (in the positive direction in relation to the direction of the x axis) of the projecting end portion 32c3, while the rear rotation restricting projection 32c4 is formed at a left end (the negative direction in relation to the direction of the x axis) of the projecting end portion 32c3.

A recessed engaging hole which is not a through hole is provided on each of left and right side surfaces of the flat plate portion 32c as a restricting engaging portion 32c5. This restricting engaging portion 32c5 is brought into detachable engagement with a projecting rotary engaging portion 34c on the cover member 34, which will be described later.

Figure 5A:
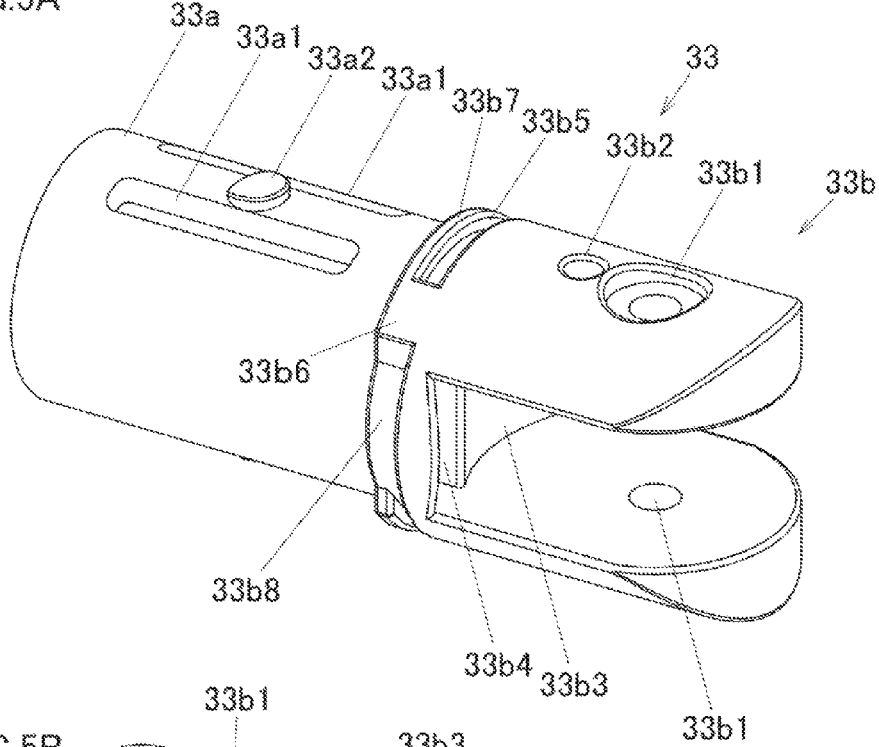
FIG. 5A is a perspective view of a rotary member according to the embodiment of the invention as seen obliquely from there above.
Figure 5B:
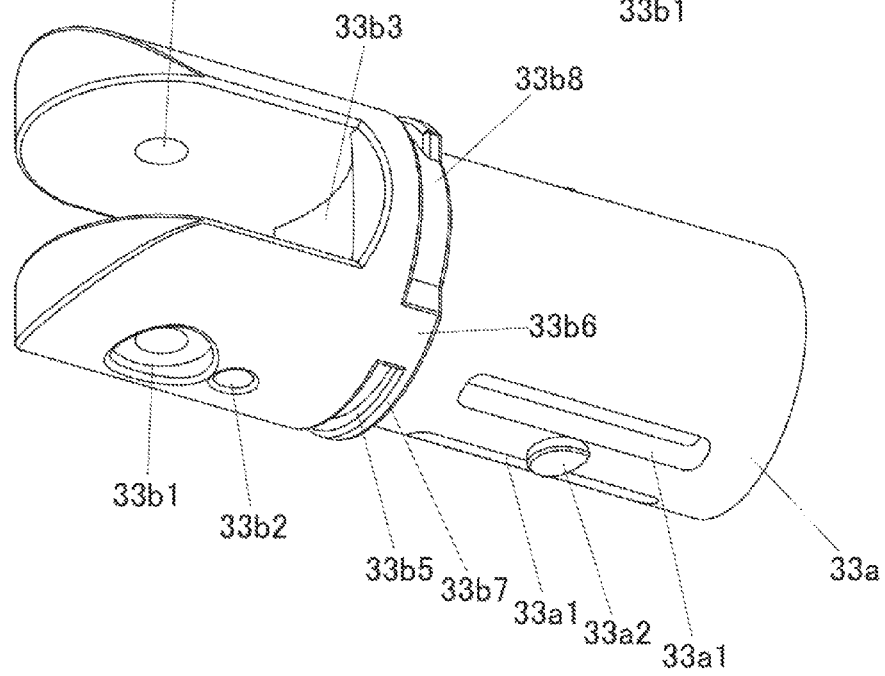
FIG. 5B is a perspective view showing the rotary member according to the embodiment of the invention as seen obliquely from there below.

Next, the rotary member 33 will be described based on FIGS. 5A and 5B. FIG. 5A is a perspective view resulting from looking down at the rotary member 33, and FIG. 5B is a perspective view resulting from looking up at the rotary member 33. The rotary member 33 is formed from a resin material through injection molding and has a short rod shape. A cylindrical joint shaft 33a is formed at one end side of the rotary member 33, and the pipe (203 or the like) is inserted into the cylindrical joint shaft 33a to be connected thereto. Two parallel cutout portions 33a1 and a locking projection 33a2 are provided on a cylindrical outer circumferential wall of the joint shaft 33a. In addition, two cutout portions 33a and a locking projection 33a2 are also formed at a diametrically opposite location on the cylindrical outer circumferential wall. The pipe (203 or the like) is fitted on this joint shaft 33a in a similar manner to that in which the pipe is fitted on the joint shaft 32a of the joint main body 32.

A bifurcate portion 33b is formed at the other end side of the rotary member 33. An outer circumferential surface of the bifurcate portion 33b has an arc-like vertical sectional shape. The outer circumferential surface of the bifurcate portion 33b is formed so as to be substantially level with the outer circumferential surface of the pipe (203 or the like) when the pipe (203 or the like) is fitted on the cylindrical joint shaft 33a for connection thereto. A distal end portion of the bifurcate portion 33b has a projecting arc-like shape when seen from there above. Consequently, the interference of the rotary member 33 with a proximal end portion of the flat plate portion 32c of the joint main body 32 is avoided when the rotary member 33 is folded.

Then, the through holes 33b1 are provided at a substantially central portion on the outer circumferential surface of the bifurcate portion 33b, and the outer circumferential surface lying around the through holes 33b1 is countersunk. In connecting the flat plate portion 32c (refer to FIG. 4) of the joint main body 32 to the bifurcate portion 33b, the flat plate portion 32c is interposed between fork portions of the bifurcate portion 33b so as to be held there between, and then, as has been described before, the pin member is inserted through the through holes 33b1 and the through hole 32c2 of the flat plate portion 32c whereby the flat plate portion 32c is connected to the bifurcate portion 33b.

Recessed engaging holes, which are not a through hole, are provided on the outer circumferential surface of the bifurcate portion 33b in a position lying closer to the joint shaft 33a than the through holes 33b1 as a releasing engaging portion 33b2. The projecting rotary engaging portions 34c (refer to FIG. 6) on the cover member 34, which will be described later, are brought into detachable engagement with the corresponding releasing engaging portions 33b2.

Figure 7:
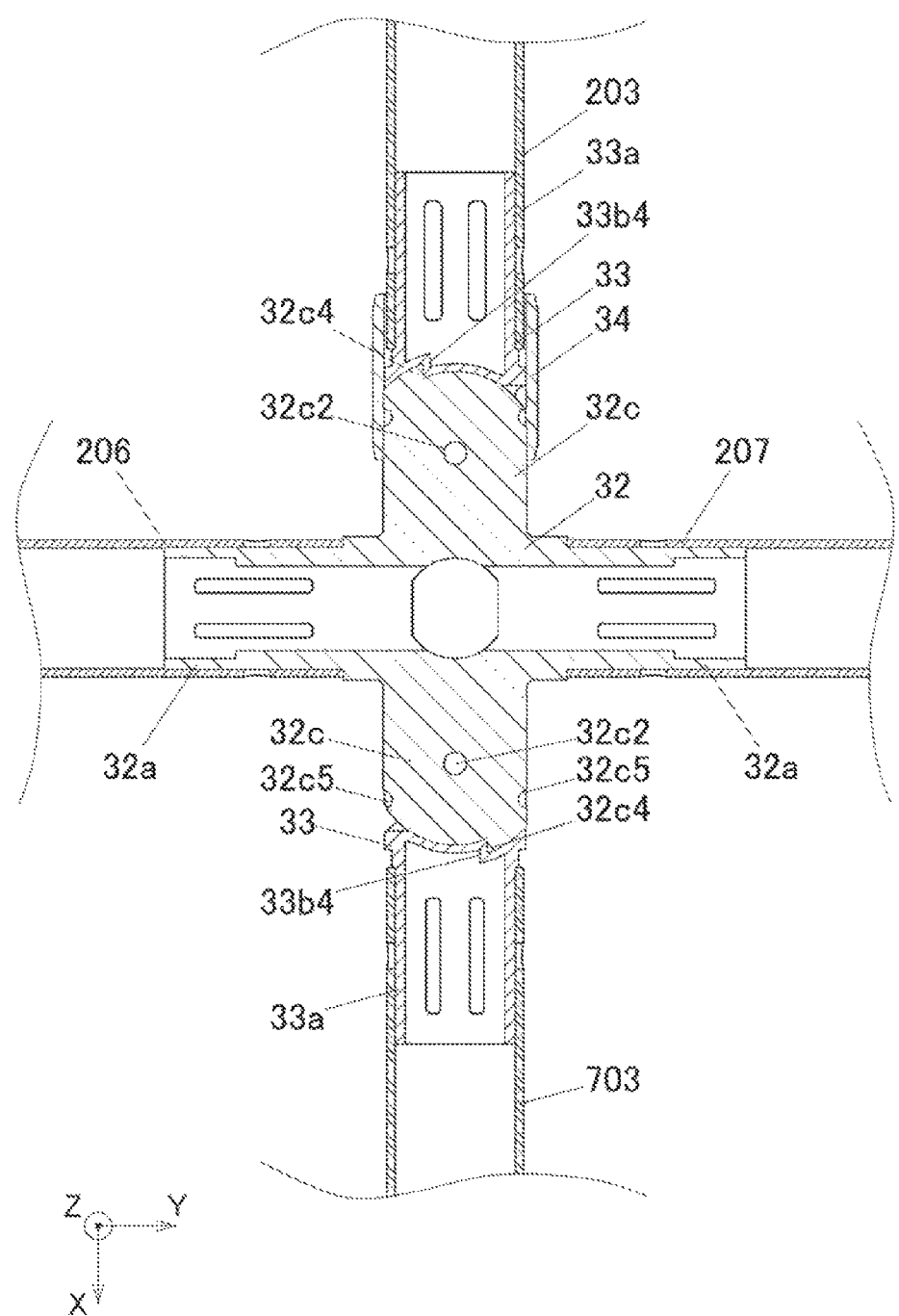
FIG. 7 is a horizontal cross-sectional view of a main part of the jungle gym joint taken along an x-y plane showing the jungle gym joint and the pipes connected thereto according to the embodiment of the invention.

A surface 33b3 of the bifurcate portion 33b which lies between the two fork portions thereof faces the projecting end portion 32c3 of the flat plate portion 32c when the bifurcate portion 33b is connected to the flat plate portion 32c of the joint main body 32. Then, the surface 33b3 of the bifurcate portion 33b which lies between the two fork portions thereof has a recessed arc-like shape when seen from there above so as to follow the projecting end portion 32c3 of the flat plate portion 32c. Further, as shown in FIG. 7, too, an abutment portion 33b4 is provided on the surface 33b3 so as to be formed as a step portion.

A state in which the joint main body 32 and the rotary members 33 are connected together will be described by reference to a sectional view shown in FIG. 7. As shown in FIG. 7, in such a state that the pipes 203, 703 are deployed, the abutment portions 33b4 of the rotary members 33 and the rotation restricting projections 32c4 of the flat plate portions 32c of the joint main body 32 are in abutment with each other. Consequently, the pipes 203, 703 are restricted from rotating counterclockwise about the pin members which are inserted through the through holes 32c2 (the through holes 33b1) from this deployed state. Then, when the pipe 203 is folded by rotating the cover member 34, in FIG. 7, the pipe 203 is rotated clockwise and is so rotated until the cover member 34 is brought into abutment with the annular portion 32a3. Similarly, when the pipe 703 is also folded, the pipe 703 is rotated clockwise and is so rotated until the rotary member 33 folded is brought into abutment with the annular portion 32a3 of the joint main body 32. In this way, the pipes 203, 703 are allowed to be folded in one direction within the angular extent of 90 degrees.

Returning to FIG. 5, a guide groove 33b5 having a recessed groove-like sectional shape is formed at a proximal end portion of the bifurcate portion 33b of the rotary member 33 so as to extend about the axis thereof in a circumferential direction. The projecting portions 34b of the cover member 34(refer to FIG. 6), which will be described later, are brought into sliding engagement with the guide grooves 33b5. A rotation restricting portion 336b is formed at the proximal end portion of the bifurcate portion 33b so as to intersect the guide groove 33b5 at right angles. As shown in FIGS. 5A, 5B, two rotation restricting portions 33b6 are formed individually at diametrically opposite locations.

One circumferential side surface of an end portion of the rotation restricting portion 33b6 which faces the joint shaft 33a is connected to a circumferential wall 33b7 which makes up the guide groove 33b5. The other circumferential side surface of the end portion of the rotating restricting portion 33b6 which faces the joint shaft 33a faces an open portion 33b8 which is formed by cutting out the circumferential wall 33b7. Two open portions 33b8 are also formed at diametrically opposite locations. When assembling the cover member 34 to the rotary member 33, the two projecting portions 34b of the cover member 34 are aligned with the two open portions 33b8 and are then inserted into the corresponding open portions 33b8.

An axial position of the pipe (203 or the like) which is connected to the rotary member 33 is determined by locking the locking projections 33a2 in the locking holes 180. Consequently, the surface of the circumferential wall 33b7 which faces the joint shaft 33a is positioned close to or is brought into contact with an end face of the pipe (203 or the like). As another configuration of the guide groove 33b5, the guide groove may be formed by the end face of the pipe (203 or the like) which is connected and a circumferential step portion which falls from the outer circumferential surface of the bifurcate portion 33b in place of the circumferential wall 33b7. As this occurs, the cover member 34 can be provided so as to rotate about the axis thereof. Consequently, in assembling the cover member 34 to the rotary member 33, the necessity of aligning the projecting portions 34b of the cover member 34 with the open portions 33b8 can be obviated.

Figure 6A:
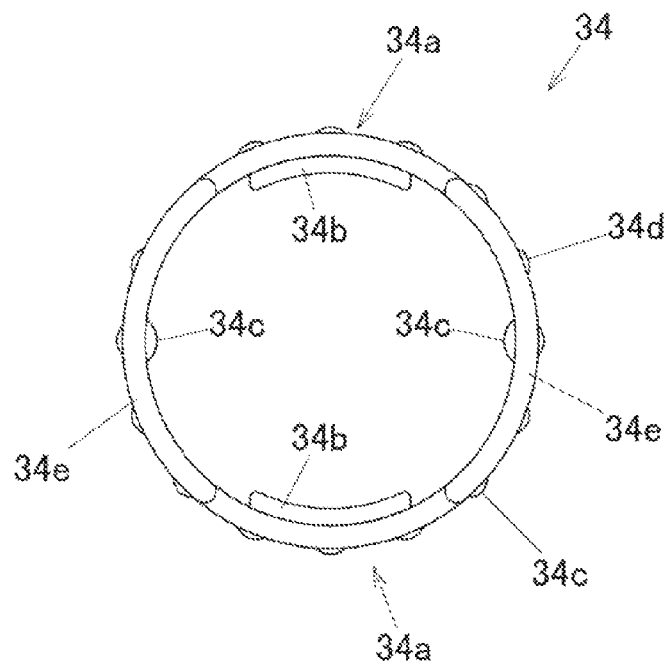
FIG. 6A is a front view showing a cover member according to the embodiment of the invention.
Figure 6B:
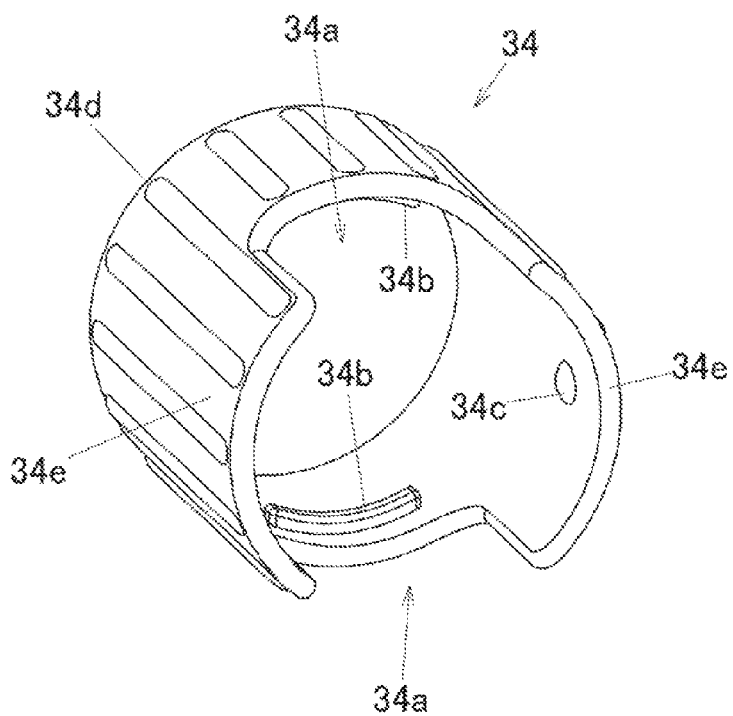
FIG. 6B is a perspective view showing the cover member according to the embodiment of the invention.

Next, the cover member 34 will be described based on FIGS. 6A and 6B. The cover member 34 has the cylindrical shape. The cover member 34 includes a cutout 34a which is formed by cutting out the outer circumferential wall thereof. Two cutout portions 34a are formed in the outer circumferential wall of the cover member 34 so as to be diametrically opposite to each other. Although will be described later, portions of the outer circumferential wall portion which lie circumferentially adjacent to the cutout portions 34a are made as a restricting wall portion 34e which restricts the folding of the folding portion 31.

The two projecting portions 34b each having a predetermined circumferential length are formed at the locations which lie diametrically opposite to each other on an inner circumferential surface of the cover member 34. The two projecting rotary engaging portions 34c are formed on inner circumferential surfaces of the restricting wall portions 34e at diametrically opposite locations which are shifted 90 degrees from the corresponding projecting portions 34b. A number of axially elongated slip preventing projections 34d are formed on the outer circumferential surface of the cover member 34.

As has been described before, the projecting portions 34b of the cover member 34 which is formed in the way described above are brought into sliding engagement with the guide grooves 33b5. Consequently, the cover member 34 can rotate about the axis of the cover member 34 while being restricted from moving in the axial direction of the cover member 34.

On the other hand, the restricting engaging portions 32c5 of the flat plate portion 32c and the releasing engaging portions 33b2 of the rotary member 33 which are both brought into engagement with the rotary engaging portions 34c of the cover member 34 are provided at phase intervals of 90 degrees about the axis. Consequently, the cover member 34 is operated to rotate about the axis within the angular extent of 90 degrees, whereby the rotary engaging portions 34c are brought into engagement with the restricting engaging portions 32c5 or the releasing engaging portions 32b2 at a terminating end of the angular extent. Consequently, the operator can feel a sensation of clicking while rotating the cover member 34. Further, the projecting portions 34b are brought into abutment with the rotation restricting portions 33b6 to thereby restrict the cover member 34 from being rotated to such an extent as to exceed the angular extent of 90 degrees.

In switching the folding portion 31 between a folding restricted state and a restriction released state, the folding portion 31 will be controlled by the cover member 34 as below. As shown in FIGS. 2 and 7, with the cutout portions 34a positioned at the bifurcate portion 33b, even though the pipe 203 is attempted to be folded, since both the side surfaces of the flat plate portion 32c are in abutment with the two restricting wall portions 34e of the cover member 34, the pipe 203 is restricted from being folded at the folding portion 31.

Figure 8A:
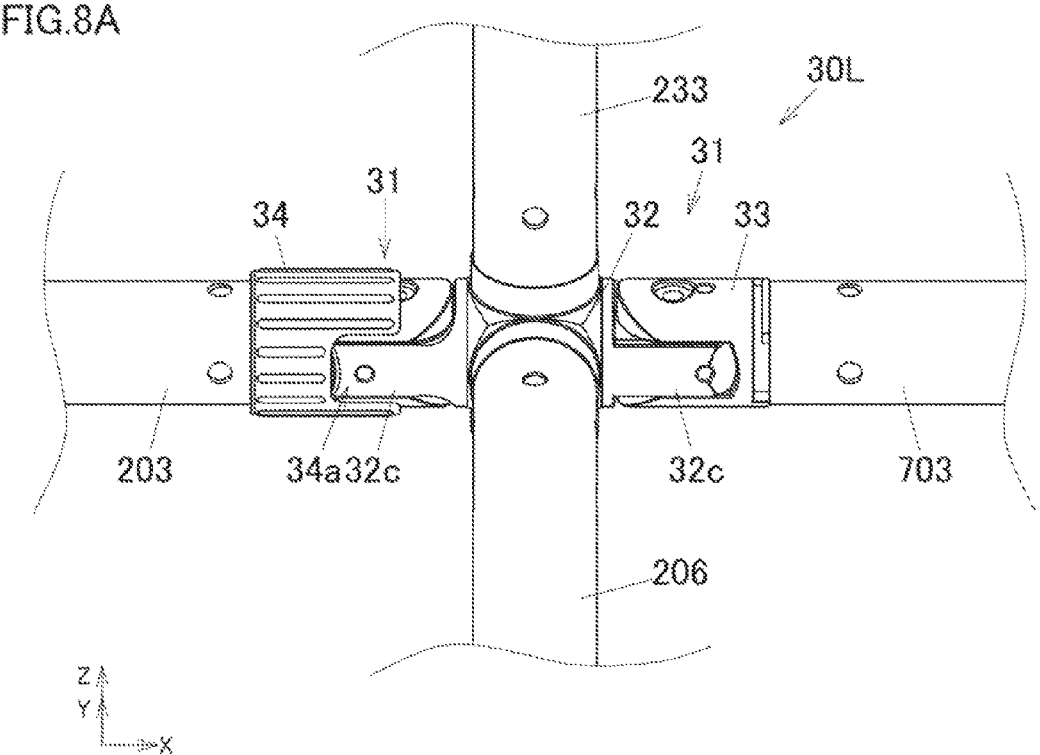
FIG. 8A is an enlarged view of the main part of the jungle gym joint showing the jungle gym joint and the pipes connected thereto according to the embodiment of the invention with the cover member rotated.
Figure 8B:
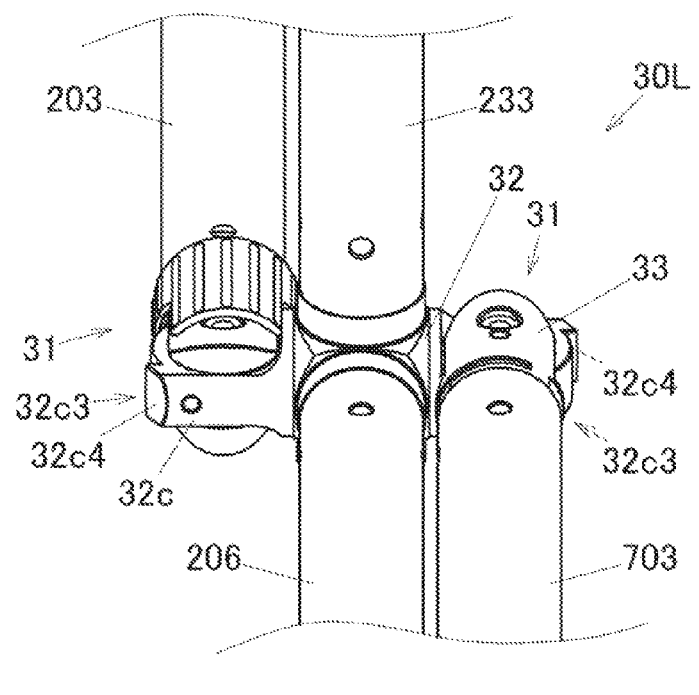
FIG. 8B is an enlarged view of the main part of the jungle gym joint showing the jungle gym joint and the pipes connected thereto with the pipes folded.
Figure 9:
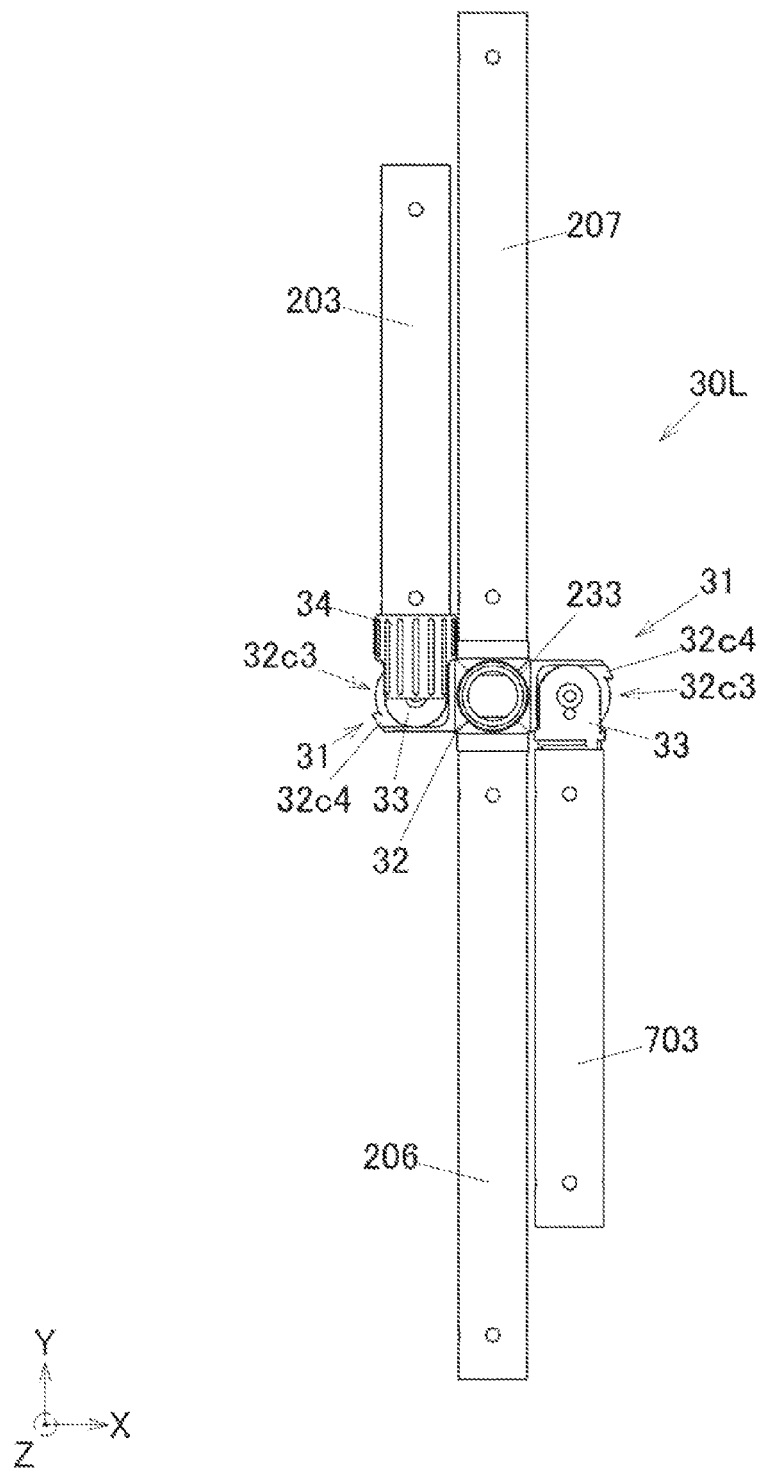
FIG. 9 is a plan view of the jungle gym joint and the pipes connected thereto according to the embodiment of the invention with the pipes folded.

Then, when the cover member 34 is rotated through 90 degrees, as shown in FIG. 8A, the cutout portions 34a are positioned at both the side surfaces of the flat plate portion 32c. Since the cutout portions 34a are a cutout having a cut-out width equaling on the order of the thickness of the flat plate portion 32c, the restriction of the folding of the folding portion 31 is released, whereby as shown in FIGS. 8B and 9, the pipe 203 can be folded.

In the states shown in FIGS. 2 and 7 where the folding portion 31 is restricted from being folded, the rotary engaging portions 34c of the cover member 34 are brought into engagement with the restricting engaging portions 32c5 of the flat plate portion 32c. On the other hand, in the states shown in FIGS. 8A, 8B and 9 where the restriction of the folding of the folding portion 31 is released, the rotary engaging portions 34c of the cover member 34 are brought into engagement with the releasing engaging portions 33b2 of the bifurcate portion 33b. In this way, the rotary engaging portions 34c of the cover member 34 are brought into engagement with the restricting engaging portions 32c5 and the releasing engaging portions 33b2 when in the folding restricted state and the folding restriction released state, respectively. Thus, the operator can feel that the cover member is switched to either of these states by feeling the sensation of clicking which is felt as a result of the engagement of the engaging portions.

In addition to the jungle gym joint 30L described heretofore, the joints which are disposed at the apex portions of each cubic frame are formed as follows. The three-branch jungle gym joints (30A, E, G, K, N, P) have a total of three joint shafts 32a, 33a of two fixed joint shafts 32a and one foldable joint shaft 33a which project from the proximal portion 32b in three directions which spread at right angles to one another. The four-branch jungle gym joints (30B, F, H, Q) have three fixed joint shafts 32a which project from the proximal portion 32b in three directions which spread at right angles to one another within one plane and one foldable joint shaft 33a which projects from the proximal portion 32b in a direction normal to the plane defined by the three fixed joint shafts 32a. The four-branch jungle gym joint (30D) has two fixed joint shafts 32a which project from the proximal portion 32b in two directions which spread at right angles to each other and two foldable joint shafts 33a which project from the proximal portion 32b to both sides in directions normal to a plane defined by the two fixed joint shafts 32a. The five-branch jungle gym joint (30J) has four fixed joint shafts 32a which project from the proximal portion 32b in four directions which spread at right angles to one another within a plane and one foldable joint shaft 33a which projects from the proximal portion 32b in a direction normal to the plane defined by the four fixed joint shafts 32a. The five-branch jungle gym joints (30C, M) have three fixed joint shafts 32a which project from the proximal portion 32b in four direction which spread at right angles to one another and two foldable joint shafts 33a which project from the proximal portion 32 to both sides in a normal direction to the plane defined by the three fixed joint shafts 32a.

In this way, the folding portion 31 where the flat plate portion 32c of the joint main body 32 and the bifurcate portion 33b of the rotary member 33 are connected together so as to be folded is provided on all the pipes (203 and the like) extending in the x axis direction to which the jungle gym joints (30A and the like) are connected. On the other hand, the cover member 34 should be provided on at least one folding portion 31 in the same unit which is formed by the cubic frame and the half cubic frame which are connected together in the z axis direction.

For example, as shown in FIG. 1, in a unit made up of the base frame group 100, the half frame group 200 which is connected to the upper side of the base frame group 100 in the z axis direction, the upper half frame 300 which is connected to the upper side of the central half cubic frame of the half frame group 200 in the z axis direction and the top frame 400 which is made up of the cubic frame which is connected to the upper side of the upper half frame 300 in the z axis direction, in case the cover member 34 is provided on at least one folding portion 31 of the folding portions 31 provided in the unit, the folding of the folding portions 31 of the whole unit can be restricted or permitted.

However, for the stable use of the jungle gym 100, it is desirable to provide the cover member 34 on at least the jungle gym joints 30J, 30L which are connected at the ends of the pipes (202, 302, 203, 303) extending in the x axis direction of the central half cubic frame of the half frame group 200. This is because in the unit in which the cubic frames are stacked on one another in the perpendicular direction, much of the load resulting when in use is exerted on the central cubic frame.

At least one additional cover member 34 needs to be provided on the folding portion 31 of the additional base frame 600 which is the cubic frame additionally connected to the unit.

Figure 10:
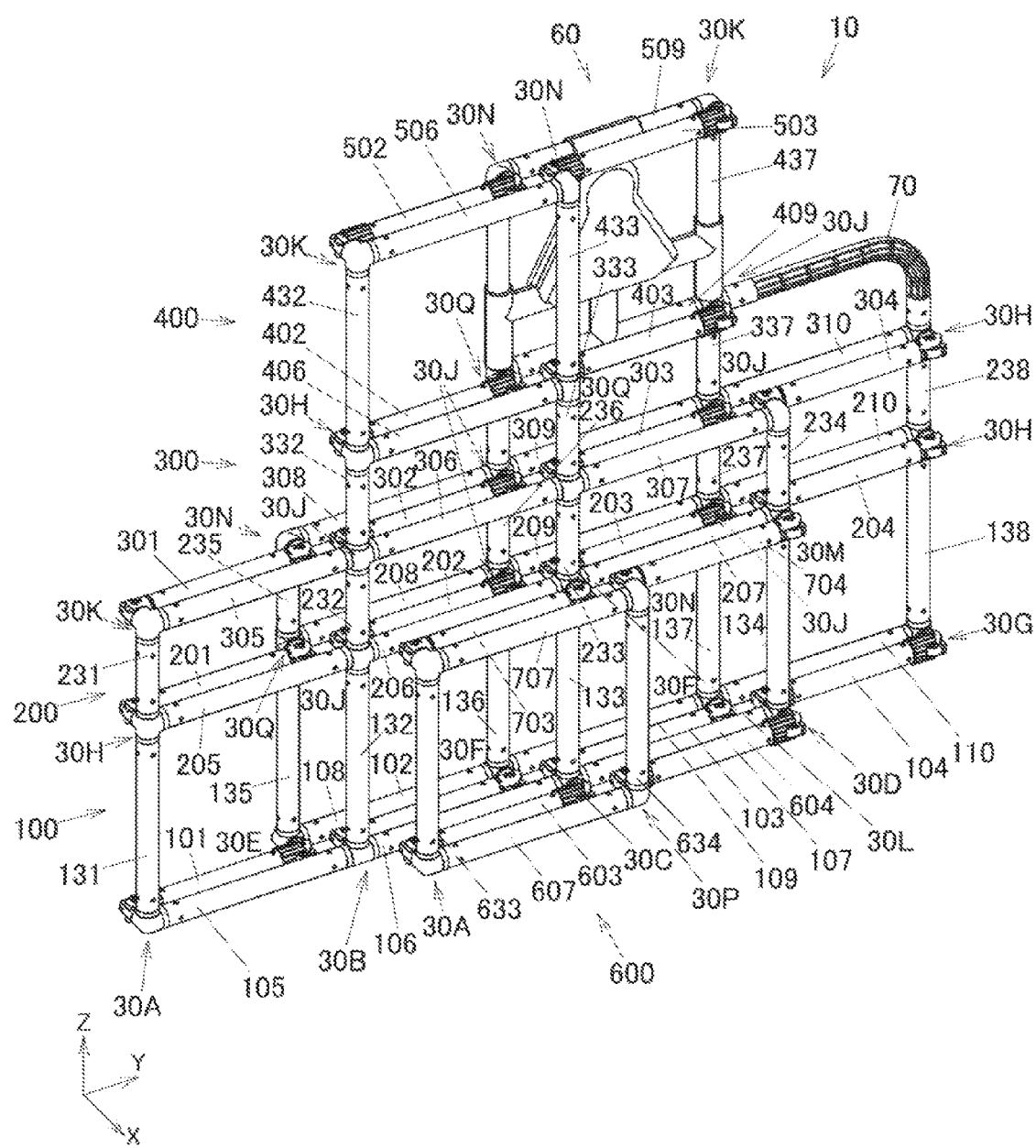
FIG. 10 is a perspective view of the jungle gym according to the embodiment which is in a folded state.

Next, the folding operation of the jungle gym 10 will be described. Firstly, in the deployed state shown in FIG. 1, the cover members 34 of the jungle gym 10 are operated to rotate so as to release the restriction of the folding of the pipes. Thereafter, when the jungle gym 10 is folded, the jungle gym 10 can be folded into a state shown in FIG. 10.

Namely, in the jungle gym 10 which is folded, the pipe (for example 202) extending in the x axis direction in the deployed jungle gym 10 is disposed between the pipes (for example, the pipe 206 and the pipe 208) of the two laterally adjacent cubic frames in the deployed jungle gym 10 which extend in the y axis direction and which face each other while lying almost close to one another. The pipes (for example, the pipe 205, the pipes 206, 207) extending in the y axis direction which are disposed in series in the deployed jungle gym 10 are kept disposed in series, and the pipes (for example, the pipe 201 and the pipes 202, 203) extending in the x axis direction in the deployed jungle gym 10 are folded to be disposed parallel to the y axis while kept in series with one another. Then, the thickness of the base frame group 100 of the jungle gym 10 which is folded can be regarded as being equal to a total of the thicknesses of the three pipes (for example, the pipe 202 in the x axis direction and the pipes 206, 208 in the y axis direction) which are arranged almost close to one another even at a thickest portion.

Figure 11A:
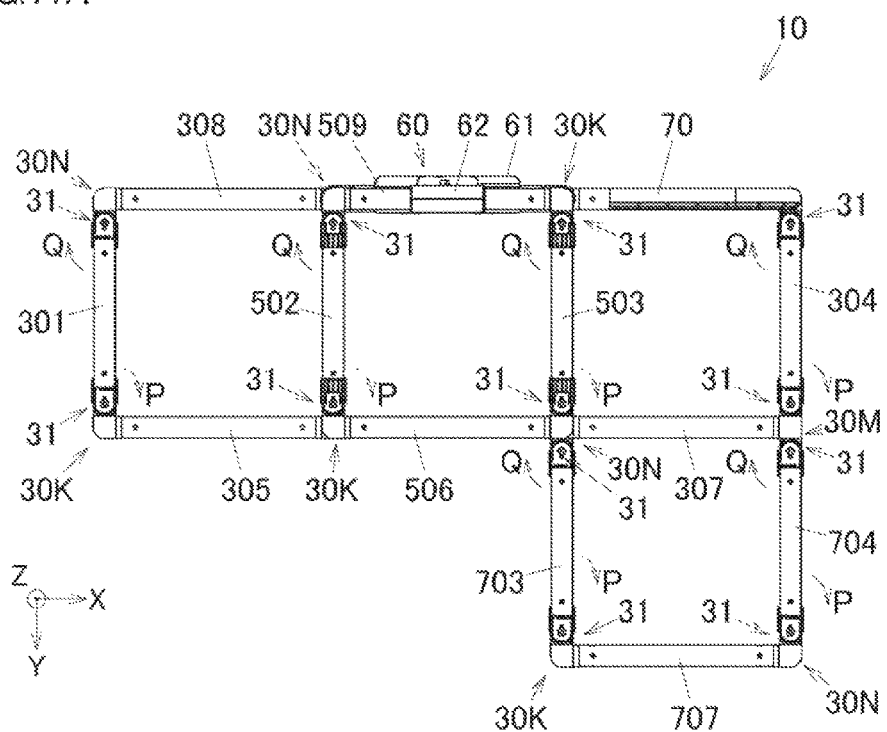
FIG. 11A is a plan view showing the jungle gym according to the embodiment of the invention which is in use (deployed).
Figure 11B:
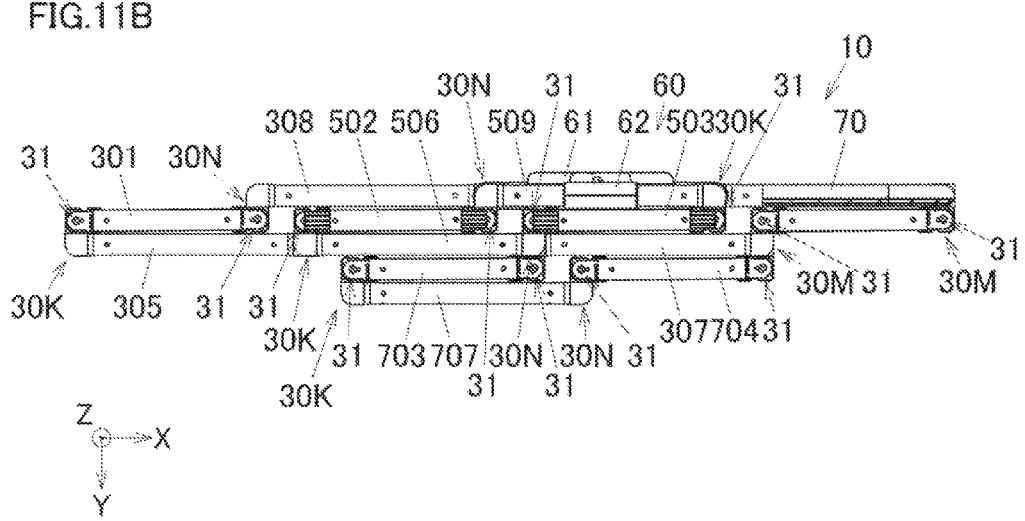
FIG. 11B is a plan view showing the jungle gym according to the embodiment of the invention which is stowed (folded).

All the folding portions 31 are rotated to be folded in the same direction. Namely, as shown in FIGS. 11A, 11B, the direction (indicated by arrows P) in which the folding portions 31 of the front jungle gym joints (30K and the like) of the base frame group 100 and the top frame 400 are folded to be rotated and the direction (indicated by arrows Q) in which the folding portions 31 of the rear jungle gym joints (30N and the like) are folded to be rotated are the same clockwise direction when the jungle gym 10 is seen from there above in FIGS. 11A, 11B. Further, the folding portions 31 of the jungle gym joints (30K and the like) of the additional base frame 600 are also rotated to be folded in the clockwise direction.

In addition, even though the unit is formed by providing the half frame group 200, the upper half frame 300 and the top frame 400 on the base frame group 100, as shown in FIGS. 11A, 11B, the resulting thickness of the unit which is folded becomes only the total of the thicknesses of the three pipes. Further, even though the additional base frame 600 is provided, all the pipes are made to closely contact each other in the thickness direction, and therefore, the jungle gym 10 can be folded to a minimum thickness.

Figure 12:
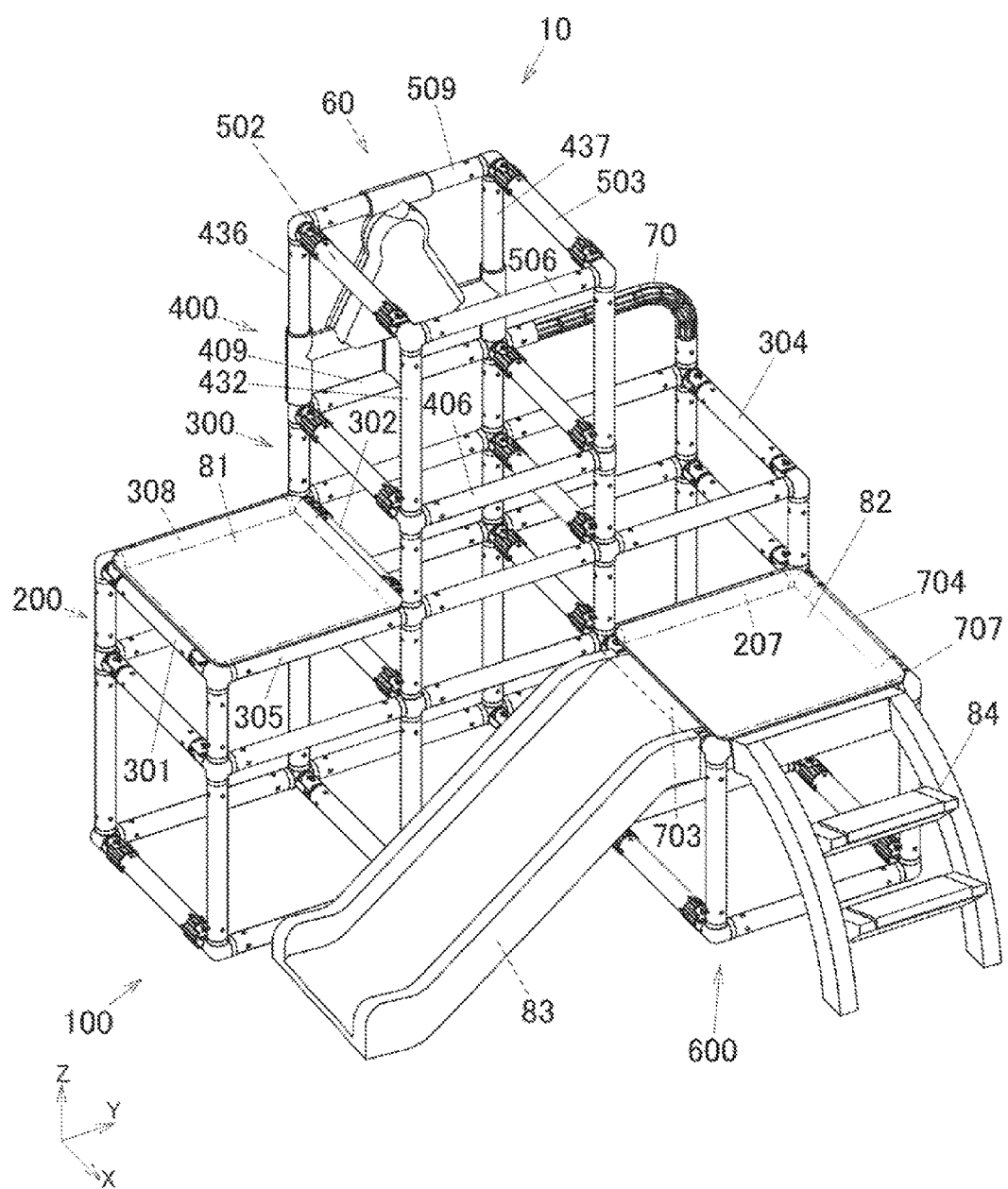
FIG. 12 is a perspective view showing a utilization example of the jungle gym according to the embodiment of the invention.

In addition, as shown in FIG. 12, step boards 81, 82, a slide 83 and a ladder including steps 84 can be provided on the jungle gym 10. Here, the step boards 81, 82 are provided on an upper surface of the left half cubic frame of the half frame group 200 and on an upper surface of the additional base frame 600, respectively. The step board 81 is placed so as to be brought into engagement with the pipes 301, 302 extending in the x axis direction and the pipes 305, 308 extending in the y axis direction. Similarly, the step board 82 is placed so as to be brought into engagement with the pipes 703, 704 extending in the x axis direction and the pipes 707, 207 extending in the y axis direction. Consequently, the folding portions 31 of the jungle gym joints (30A and the like) of the jungle gym 10 can also be restricted from being folded by making use of these step boards 81, 82.

The slide 83 is provided on a pipe 703 of the additional base frame 600. However, a slide which is longer than this slide 83 may be prepared so that the long slide is connected to the pipe 305 or the like of the half frame group 200. As this occurs, a sliding distance provide by the long slide is extended longer than a sliding distance provided by the slide 83, and therefore, the jungle gym 10 can be modified so as to match ages and physical strengths of infant users.

Additionally, infant users can also be allowed to enjoy looking at decorations made on the flat surface portion of the fixed member 60. This fixed member 60 is fixed to the pipe (409 or the like) in the y axis direction and the pipe (436 or the like) in the z axis direction, and therefore, the jungle gym 10 can be folded with the fixed member 60 left attached to the jungle gym 10. In addition, the curved pipe 70 can be used as a hand rail, and therefore, even small infants can enjoy playing with the jungle gym 10. As with the fixed member 60, this curved pipe 70 is attached parallel to a y-z plane, and therefore, the jungle gym 10 can also be folded with the curved pipe 70 left attached to the jungle gym 10.

Thus, while the embodiment of the invention has been described heretofore, the invention is not limited to the embodiment but can be carried out in various forms. For example, the relationship between the bifurcate portion 33*b* of the rotary member 33 and the flat plate portion 32*c* of the joint main body 32 is reversed, so that a configuration can be adopted in which the flat plate portion is provided on the rotary member 33, while the bifurcate portion is provided on the joint main body 32.

In addition, the cover member 34 maybe provided on the joint main body 32. Additionally, the projecting portions 34*b* on the cover member 34 are replaced by the guide grooves 33*b*5 Of the rotary member 33, so that a configuration may be adopted in which guide grooves are provided on the cover member 34 and projecting portions are provided on the rotary member 33. Similarly, the irregular relationship between the rotary engaging portions 34*c* of the cover member 34 which are formed to project and the restricting engaging portions 32*c*5 and the releasing engaging portions 33*b*2 which are formed so as to be recessed may be reversed. In this embodiment, the pipe (203 or the like) is connected directly to the joint shaft 33*a* of the rotary member 33, the pipe may be connected indirectly to the joint shaft 33*a* via a spacer. In addition, in this embodiment, the folding portion 31 is described as being folded within the angular extent of 90 degrees. However, this angular extent can be set to an arbitrary extent.

Further, in this embodiment, the folding portion 31 is formed so as to be folded in parallel to the x-y plane. However, the folding portion 31 may be formed so as to be folded in parallel to an x-z plane so that the jungle gym 10 can be folded in an up-to-down direction. However, as this occurs, in the event that a cubic frame is superposed on the base frame group 100, a similar cubic frame to the cubic frame of the base frame group 100 is superposed, and a cubic frame similar to those of the half frame group 200 can be connected in the y axis direction.

There is imposed no specific limitation on the numbers of cubic frames and half cubic frames which are additionally connected to the three cubic frames which are formed continuously in the direction of the y axis and the directions in which they are connected to the three cubic frames.

In addition, the embodiment described heretofore is only the example, and hence, there is no intention to limit the scope of the invention by the embodiment. The novel embodiment can be carried out in other various forms, and various omissions, replacements and modifications can be made without departing from the spirit and scope of the invention. The resulting embodiments and modifications are included in the scope and spirit of the invention and are also included in the scope of inventions claimed under claims and equivalents thereof.

What is claimed is:

1. A jungle gym having:
   a base frame group in which three cubic frames are formed continuously in the direction of a y axis by a plurality of pipes provided in the direction of an x axis, a plurality of pipes provided in the direction of the y axis and a plurality of pipes provided in the direction of a z axis; and
   a plurality of jungle gym joints each comprising a joint main body and a rotary member and in which the rotary member is connected rotatably to the joint main body so as to form a folding portion which is configured to be folded in one direction within an angular extent of 90 degrees,
   wherein the pipes provided in the direction of the y axis and the pipes provided in the direction of the z axis are connected to the joint main bodies,
   wherein the pipes provided in the direction of the x axis are connected to end portions of the rotary members which lie opposite to end portions where the folding portions are formed,
   wherein the folding portion is such that a flat plate portion and a bifurcate portion are connected rotatably in such a way that the flat portion is inserted into the bifurcate portion so as to be held therein,
   wherein at least one of the folding portions comprises a cylindrical cover member which is restricted from moving in the direction of an axis of the cover member while being allowed to rotate about the axis, and
   wherein the cover member comprises a restricting wall portion configured to restrict the folding portion from being folded by bringing a circumferential wall thereof into abutment with either the flat plate portion or the bifurcate portion.

2. The jungle gym according to claim 1,
   wherein the cover member further comprises a cutout portion which is formed in the circumferential wall by partially cutting out the circumferential wall so as not to be brought into abutment with either the flat plate portion or the bifurcate portion to thereby release the folding of the folding portion.

3. The jungle gym according to claim 2, further comprising:
   a half frame group in which three half cubic frames whose height in the direction of the z axis is half a height of the cubic frames of the base frame group are provided continuously from the base frame group in the direction of the z axis;
   an upper half frame which is provided continuously from a central half cubic frame of the half frame group in the direction of the z axis; and
   a top frame which is a cubic frame provided continuously from the upper half frame in the direction of the z axis, wherein the folding portions are formed so as to be folded about the z axis.

4. The jungle gym according to claim 2, further comprising an additional base frame which is a cubic frame provided continuously from one cubic frame of the base frame group in the direction of the x axis.

5. The jungle gym according to claim 2, further comprising:
   a half frame group in which three half cubic frames whose height in the direction of the z axis is half a height of the cubic frames of the base frame group are provided continuously from the base frame group in the direction of the z axis;
   an upper half frame which is provided continuously from a central half cubic frame of the half frame group in the direction of the z axis;
   a top frame which is a cubic frame provided continuously from the upper half frame in the direction of the z axis, and
   an additional base frame which is a cubic frame provided continuously from one cubic frame of the base frame group in the direction of the x axis,
   wherein the folding portions are formed so as to be folded about the z axis.

6. The jungle gym according to claim 2, further comprising a fixed member having a decorated flat surface portion and fixed to a pipe in the pipes provided in the direction of the y axis and a pipe in the pipes provided in the direction of the z axis.

7. The jungle gym according to claim 1, wherein the cover member is provided individually at at least four central folding portions of the folding portions.

8. The jungle gym according to claim 7, further comprising:
   a half frame group in which three half cubic frames whose height in the direction of the z axis is half a height of the cubic frames of the base frame group are provided continuously from the base frame group in the direction of the z axis;
   an upper half frame which is provided continuously from a central half cubic frame of the half frame group in the direction of the z axis; and
   a top frame which is a cubic frame provided continuously from the upper half frame in the direction of the z axis, wherein the folding portions are formed so as to be folded about the z axis.

9. The jungle gym according to claim 7, further comprising an additional base frame which is a cubic frame provided continuously from one cubic frame of the base frame group in the direction of the x axis.

10. The jungle gym according to claim 7, further comprising:
    a half frame group in which three half cubic frames whose height in the direction of the z axis is half a height of the cubic frames of the base frame group are provided continuously from the base frame group in the direction of the z axis;
    an upper half frame which is provided continuously from a central half cubic frame of the half frame group in the direction of the z axis;

a top frame which is a cubic frame provided continuously from the upper half frame in the direction of the z axis, and an additional base frame which is a cubic frame provided continuously from one cubic frame of the base frame group in the direction of the x axis, wherein the folding portions are formed so as to be folded about the z axis.

11. The jungle gym according to claim 7, further comprising a fixed member having a decorated flat surface portion and fixed to a pipe in the pipes provided in the direction of the y axis and a pipe in the pipes provided in the direction of the z axis.

12. The jungle gym according to claim 7, further comprising:

at least one combination of the jungle gym joints of the plurality of jungle gym joints, wherein the jungle gym joints of the plurality of the jungle gym joints which lie adjacent in positions which shift from each other in the direction of the y axis and the direction of the z axis are connected together by a curved pipe.

13. The jungle gym according to claim 1, further comprising:

a half frame group in which three half cubic frames whose height in the direction of the z axis is half a height of the cubic frames of the base frame group are provided continuously from the base frame group in the direction of the z axis;

an upper half frame which is provided continuously from a central half cubic frame of the half frame group in the direction of the z axis; and a top frame which is a cubic frame provided continuously from the upper half frame in the direction of the z axis, wherein the folding portions are formed so as to be folded about the z axis.

14. The jungle gym according to claim 1, further comprising an additional base frame which is a cubic frame provided continuously from one cubic frame of the base frame group in the direction of the x axis.

15. The jungle gym according to claim 1, further comprising:

a half frame group in which three half cubic frames whose height in the direction of the z axis is half a height of the cubic frames of the base frame group are provided continuously from the base frame group in the direction of the z axis;

an upper half frame which is provided continuously from a central half cubic frame of the half frame group in the direction of the z axis;

a top frame which is a cubic frame provided continuously from the upper half frame in the direction of the z axis, and an additional base frame which is a cubic frame provided continuously from one cubic frame of the base frame group in the direction of the x axis, wherein the folding portions are formed so as to be folded about the z axis.

16. The jungle gym according to claim 1, further comprising a fixed member having a decorated flat surface portion and fixed to a pipe in the pipes provided in the direction of the y axis and a pipe in the pipes provided in the direction of the z axis.

17. The jungle gym according to claim 1, further comprising:

a half frame group in which three half cubic frames whose height in the direction of the z axis is half a height of the cubic frames of the base frame group are provided continuously from the base frame group in the direction of the z axis;

an upper half frame which is provided continuously from a central half cubic frame of the half frame group in the direction of the z axis;

a top frame which is a cubic frame provided continuously from the upper half frame in the direction of the z axis, and a fixed member having a decorated flat surface portion and fixed to a pipe in the pipes provided in the direction of the y axis and a pipe in the pipes provided in the direction of the z axis, wherein the folding portions are formed so as to be folded about the z axis.

18. The jungle gym according to claim 1, further comprising at least one combination of the jungle gym joints of the plurality of jungle gym joints, wherein the jungle gym joints of the plurality of jungle gym joints which lie adjacent in positions which shift from each other in the direction of the y axis and the direction of the z axis are connected together by a curved pipe.

19. The jungle gym according to claim 1, further comprising:

a half frame group in which three half cubic frames whose height in the direction of the z axis is half a height of the cubic frames of the base frame group are provided continuously from the base frame group in the direction of the z axis;

an upper half frame which is provided continuously from a central half cubic frame of the half frame group in the direction of the z axis;

a top frame which is a cubic frame provided continuously from the upper half frame in the direction of the z axis, and at least one combination of the jungle gym joints of the plurality of jungle gym joints, wherein the jungle gym joints of the plurality of jungle gym joints which lie adjacent in positions which shift from each other in the direction of the y axis and the direction of the z axis being connected together by a curved pipe;

wherein the folding portions are formed so as to be folded about the z axis.

* * * * *